June 14, 1949.  E. H. PETERS ET AL  2,473,387
ANTI-ICING MEANS FOR AIRCRAFT
Filed May 28, 1947
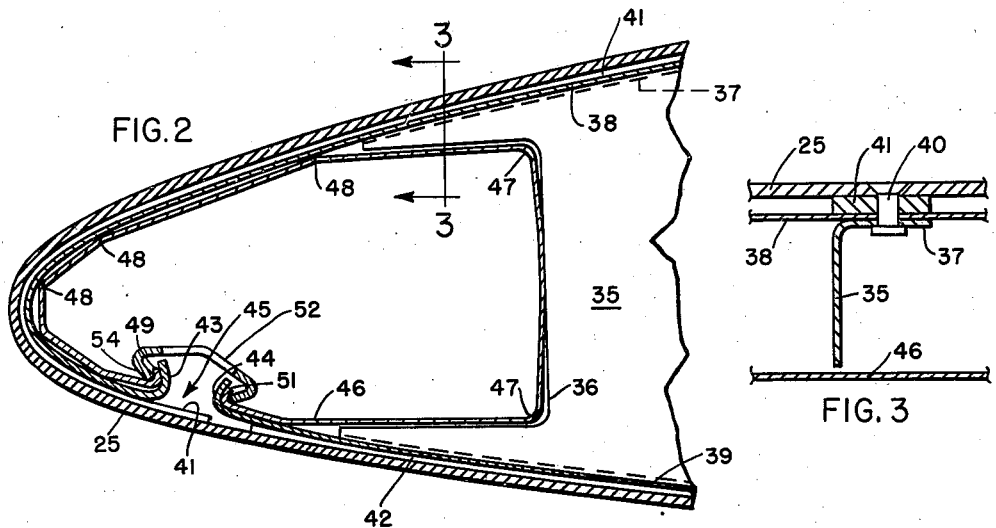
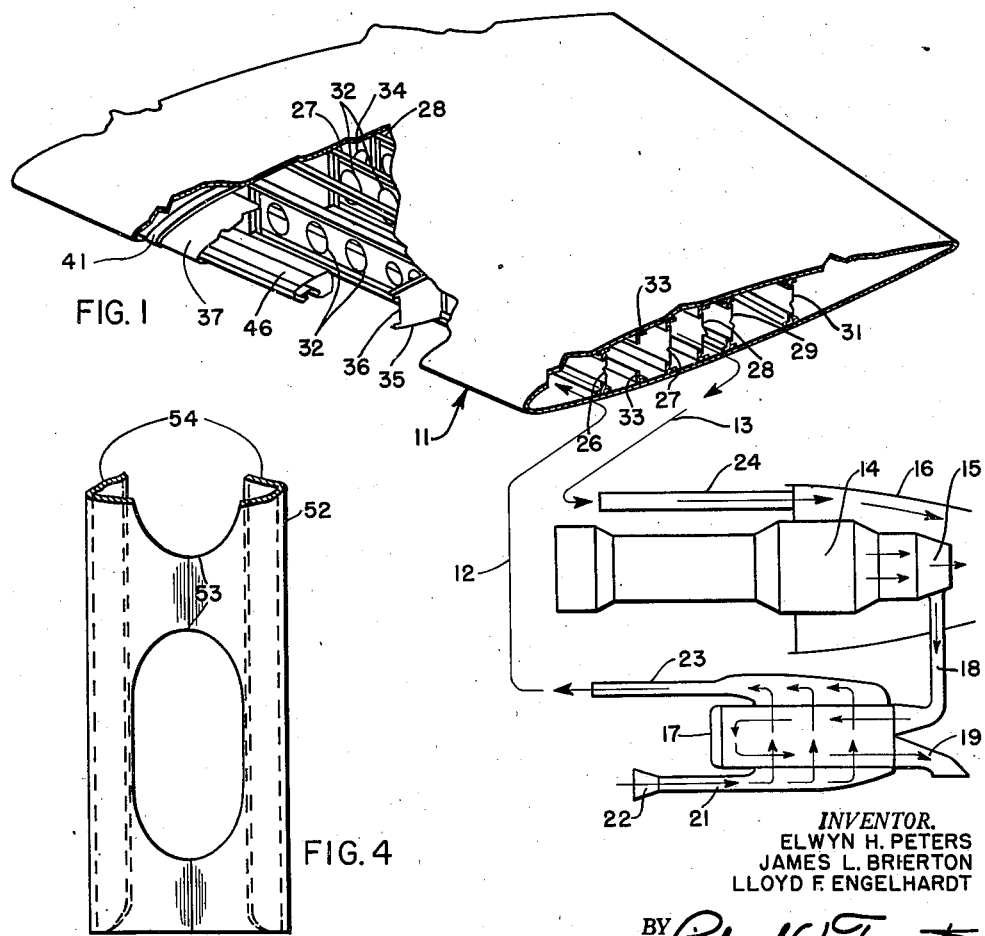
INVENTOR.
ELWYN H. PETERS
JAMES L. BRIERTON
LLOYD F. ENGELHARDT
BY Richard W. Treverton
ATTORNEY Patented June 14, 1949

2,473,387

UNITED STATES PATENT OFFICE 2,473,387

ANTI-ICING MEANS FOR AIRCRAFT

Elwyn H. Peters, Lloyd F. Engelhardt, and James L. Brierton, Columbus, Ohio, assignors to Curtiss-Wright Corporation, a corporation of Delaware Application May 28, 1947, Serial No. 750,968

8 Claims. (Cl. 244—134)

The present invention relates to anti-icing means for aircraft, and particularly to means for conducting heated fluid through airfoils for this purpose.

Arrangements have heretofore been provided whereby heated fluid, usually air, may be passed through airplane wings and other airfoils for heating their surfaces to remove accumulations of ice or to prevent ice accumulations which otherwise might occur, while the aircraft is in operation. The present invention provides a novel airfoil structure comprising ducts for directing heated fluid, such as heated air, against the inner surface of the airfoil envelope or covering at the leading edge where icing is most likely to occur, and for thereafter returning the fluid to a part of the aircraft from which it may be discharged into the atmosphere or again be heated for recirculation through the airfoil.

The arrangement provides a duct of large cross-section extending spanwise of the airfoil arranged to discharge into a narrow space between a double wall construction at the airfoil leading edge. This enables a uniform discharge of heated fluid, and consequently a uniform heating of the leading edge, all along the span of the airfoil. The duct for heated fluid is insertable into the airfoil after the latter's major components have been completely fabricated.

The duct for heated fluid is so formed that it is compressible for insertion with a snug fit into the airfoil. When inserted, it is secured to inturned flanges, which are formed on the inner wall of the airfoil leading edge, by one or more perforated locking strips. The perforations of these locking strips conduct the heated fluid from the duct to the space between the inner and outer walls of the airfoil leading edge portion.

The foregoing and other objects and advantages of the invention will become apparent from the following description of the typical embodiment thereof shown in the accompanying drawings, wherein:

Figure 1 is a schematic illustration of the entire system, a fragmentary portion of an airfoil constructed in accordance with the invention being shown in broken perspective;

Figure 2 is a vertical longitudinal sectional view through the leading edge portion of the airfoil;

Figure 3 is a detail sectional view taken along line 3—3 of Figure 2; and

Figure 4 is a fragmentary plan view of a locking strip for the heated fluid duct.

The airfoil indicated generally at 11 may comprise a wing, horizontal stabilizer, vertical stabilizer or other part of an aircraft. The airfoil is provided with a duct within its leading edge for heated fluid, preferably air, whose entrance path into the airfoil is indicated by arrows 12 and whose exhaust path is represented by arrows 13.

The system for providing heated air to the airfoil may be of various types. One type, shown as an example, may include a turbo-jet engine 14 whose tail pipe 15 is surrounded by an annular shell portion 16 of the aircraft, and a heat exchanger 17. A portion of the exhaust gases from the engine may pass through a conduit 18 to the heat exchanger and may exhaust from the latter into the atmosphere through an exhaust pipe 19. Ram air from the outside atmosphere may enter conduit 21 through funnel 22, pass through heat exchanger 17 where it absorbs heat from the engine exhaust gases, and then pass through conduit 23 to the entrance path 12 into the airfoil. After circulating through the airfoil in a manner described hereinafter the exhaust air may follow path 13 into a conduit 24 which exhausts into the chamber within shell portion 16. Due to the high velocity of exhaust gases issuing from tail pipe 15 the pressure within this chamber is reduced below atmospheric, which supplements the effect of the ram air pressure at funnel 22 in forcing air circulation through the circuit which has just been described.

The airfoil 11 comprises an outer wall 25 reinforced by spanwise extending beams 26, 27, 28, 29 and 31. In the particular structure that has been illustrated these beams each comprise upper and lower chords of T or L cross-section and webs provided with lightening holes 32. The wall 25 may be further reinforced, as illustrated, by spanwise extending stringers 33. The airfoil is also provided at spaced stations along its span with rib sections, each such section extending between adjacent beams. As indicated, the rib section between beams 27 and 28 have holes 34 so that the space between these two beams may be utilized as the passageway for the return air whose path has been indicated at 13.

Secured to and extending forwardly of beam 26 at each rib station is a nose rib section 35 having a recess 36 in its front edge. The rib sections 35 have upper and lower flanges 37 secured by suitable means, such as by rivets 40, to the outer wall 25 and also to inner nose wall sections 38 and 39. The latter are spaced inwardly from the wall 25 by spacer strips 41 and 42, which respectively overlie and underlie the rib flanges 37 and 28. Both spacer strips extend forwardly from beam 26 and terminate, as is best shown in Figure 2, at the undersurface of the airfoil slightly aft of the leading edge.

The inner wall section 38, as shown in Figure 1, extends forwardly from a line somewhat in advance of the beam 26, and, after substantially paralleling the curvature of the wall 25 around the nose of the airfoil, terminates in an inwardly (and upwardly) curled flange 43. The inner wall section 39, also extending forwardly from a line in advance of beam 26, terminates in inwardly curled flange 44 which is spaced from flange 43 to form a spanwise slot 45.

Disposed within the nose of the airfoil is the heated air duct 46 which is preferably formed of thin and flexible sheet material with bends 47 enabling it to seat in rib recesses 36 and with bends at 48 enabling it to seat within the forward portion of inner wall section 38. The side edges of the duct are provided with inwardly curled flanges as indicated at 49 and 51 to nest in interlocking relation respectively within the inner wall flanges 43 and 44. For locking the duct in place, locking strip 52 is provided. This strip comprises a web portion having a series of openings 53 substantially aligned with slot 45, and inturned flanges 54 whose edges are adapted to engage within the curled flanges 49, 51 of duct 46. The locking strip is formed of material that is sufficiently stiff to hold the duct flanges interlocked with the inner wall flanges 43 and 44.

In fabricating the airfoil the outer envelope 25 and its reinforcements (including the beams, stringers, rib sections, inner wall sections 38 and 39, and spacing strips 41 and 42) may be assembled and permanently joined together; and thereafter the duct 46 may be inserted into the airfoil leading edge and be secured in place by means of the locking strip 52. The duct is preferably larger in cross-sectional area than the space provided for it within the airfoil. The bends 48, 49 allow it to be compressed so that it may be slid spanwise into the airfoil. When inserted the duct may expand to fit snugly against the airfoil structure which contains it. After the duct has been inserted the strip 52 is slid into place, to firmly retain the flanges 49 and 51 nested within the flanges 43 and 44. To facilitate application of the locking strip 52, it is preferably formed or cut into sections of relatively short length, on the order of about one foot in length. In the completed structure the ends of adjacent strip sections are preferably in abutting relation, although if desired the sections may be spaced.

It will be understood that if desired the airfoil may be built up of several sections, being divided either spanwise or chordwise or both. For example a wing constructed in accordance with the invention may be built up of a separately fabricated center section panel and outer or tip panels. In such case the duct 46 may be applied to each panel before the panels are assembled together, and preferably means are provided for connecting the ducts of adjacent sections either in telescoping or abutting relation. In the event the airfoil, or a panel thereof, is divided chordwise into sections, the duct may be installed either before or after such sections are secured together, as convenience or necessity may dictate.

Due to the comparatively large area of the duct 46 the flow of heated air therethrough is not substantially retarded by friction, with the result that adequate heating of the airfoil leading edge is provided at the tip portions of a wide span airfoil as well as at the root portions which may be much closer to the source of the heated air. The proportioning of heated air flow at various stations along the airfoil's span, and along the upper and lower surfaces of the envelope may be controlled in the design by the thickness of the spacers 41 and 42. For example, it will be seen from Figure 2 that of the total volume of heated air entering passage 45 from the duct 46, the portion which moves along the upper surface of the airfoil will have farther to travel and have a greater airfoil surface to heat than the portion passing rearwardly. To compensate for these differences the spacer strip 41 may be made thicker than strip 30, as is shown in Figure 2, so that a greater volume of heated air will pass forwardly from passage 45 than rearwardly.

After the air from duct 46 has passed through the space between walls 38 and 25, or between walls 39 and 25, it passes through the openings 32 in beams 26 and 27 into the spanwise return air channel which comprises the space between beams 27 and 28. This return air channel directs the return air along the path designated 13 as herein before has been described. If desired a duct or liner may be provided in this channel to reduce the drag of the return air flowing therethrough.

It will be understood that the structure herein described and illustrated represents a preferred embodiment of the invention for the type of airfoil disclosed, but, as will be apparent to those skilled in the art, the inventive principles involved are susceptible of embodiment in various other arrangements without departing from the spirit of the invention or from the scope of the appended claims.

We claim:

1. An airfoil comprising an outer wall, supporting members extending chordwise within said outer wall and having recessed forward edges, other supporting members extending spanwise within said wall, an inner wall conforming generally to the contour of the leading edge portion of the outer wall, spacing means secured to chordwise supporting members and disposed between said inner and outer walls providing fluid passages therebetween, the aft edges of the inner wall adjacent the opposite surfaces of the airfoil being in advance of the foremost spanwise supporting member to provide outlets from said fluid passages into the airfoil interior, said spanwise member and chordwise supporting members rearwardly thereof having openings for exhausting fluid which passes from said outlets, said inner wall having a pair of spaced inwardly curled flanges providing a spanwise extending slot constituting a fluid inlet for said passages, a duct extending within a spanwise space that is defined by said inner wall and said recesses in the forward edges of chordwise supporting members, said duct comprising a shell bent along spaced spanwise extending lines to render it compressible to fit snugly within said spanwise space, said duct having inwardly curled flanges interlocking within said inner wall flanges, and a duct securing member having a perforated web and return directed flanges for retaining said duct flanges in said interlocking relation, the web perforations being arranged to pass fluid from said duct into the fluid inlet of said passages.

2. An airfoil comprising an outer wall, supporting members extending chordwise within said outer wall and having recessed forward edges, other supporting members extending spanwise within said wall, an inner wall conforming generally to the contour of the leading edge portion of the outer wall, spacing means secured to chordwise supporting members and disposed between said inner and outer walls providing fluid passages therebetween, the aft edges of the inner wall adjacent the opposite surfaces of the airfoil being in advance of the foremost spanwise supporting member to provide outlets from said fluid passages into the airfoil interior, said inner wall having a pair of spaced inwardly directed flanges providing a spanwise extending slot constituting a fluid inlet for said passage, a duct extending within a spanwise space defined by said inner wall and said recesses in the forward edges of chordwise supporting members, said duct comprising a shell bent along spaced spanwise extending lines to render it compressible to fit snugly within said spanwise space, said duct having spaced inwardly directed flanges, the duct flanges and the inner wall flanges having interlocking formations, and a securing member having a perforated web and return directed flanges for retaining said duct flanges interlocked with said inner wall flanges, the web perforations being arranged to pass fluid from said duct into the fluid inlet of said passages.

3. An airfoil comprising an outer wall, rib members within said outer wall and having recessed forward edges, an inner wall conforming generally to the contour of the leading edge portion of the outer wall, spacing means secured to said rib members and disposed between said inner and outer walls, the spacing of said walls providing fluid passages therebetween, the space between the aft edges of the inner wall adjacent the opposite surfaces of the airfoil providing outlets from said fluid passages into the airfoil interior, said inner wall being divided intermediate of said edges to provide a spanwise extending slot constituting a fluid inlet for said passage, the wall having inwardly directed flanges on the opposite sides of said slot, a duct extending within a spanwise space defined by said inner wall and said recesses in the forward edges of the rib members, said duct comprising a compressible shell adapted to fit snugly within said spanwise space, said duct having a spanwise slot whose edges comprise inwardly directed flanges, the duct flanges and the inner wall flanges having interlocking formations, and a securing member having a perforated web and return directed flanges for retaining said duct flanges interlocked with said inner wall flanges, the web perforations being arranged to pass fluid from said duct into the fluid inlet of said passages.

4. An airfoil comprising an outer wall, rib members within said outer wall and having their forward edges spaced from the nose of said outer wall, an inner wall conforming generally to the contour of the leading edge portion of the outer wall, spacing strips secured to said rib members and extending between said inner and outer walls, the spacing of said walls providing fluid passages therebetween, said passages opening along the aft edges of the inner wall into the airfoil interior, said inner wall intermediate of said aft edges thereof having a pair of spaced flanges providing a spanwise extending slot constituting a fluid inlet for said passage, a duct extending within a spanwise space defined by said inner wall and said forward edges of the rib members, said duct comprising a compressible shell to fit snugly within said spanwise space, said duct having a spanwise slot whose edges comprise flanges formed for interlocking with said inner wall flanges, and securing means for retaining said duct flanges and inner wall flanges in said interlocking relation.

5. An airfoil comprising an outer wall, an inner wall conforming generally to the contour of the leading edge portion of the outer wall, spacing means between said inner and outer walls providing fluid passages therebetween, said passages opening along the aft edges of the inner wall into the airfoil interior, said inner wall intermediate of said aft edges thereof having a pair of spaced flanges providing a spanwise extending slot constituting a fluid inlet for said passage, a duct extending within said inner wall, said duct comprising a shell having a spanwise slot whose edges comprise flanges formed for interlocking with said inner wall flanges, and securing means for retaining said duct flanges and inner wall flanges in said interlocking relation.

6. An airfoil comprising an outer wall, an inner wall conforming generally to the contour of the leading edge portion of the outer wall, spacing means between said inner and outer walls providing fluid passages therebetween, said inner wall having a pair of spaced inwardly directed flanges providing a spanwise extending slot constituting a fluid inlet for said passage, a duct extending within a said inner wall, said duct comprising a shell having a spanwise slot whose edges comprise inwardly directed flanges, said duct flanges and the inner wall flanges having interlocking formations, and a securing member having a perforated web and return directed flanges for retaining said flanges in said interlocking relation, the web perforations being arranged to pass fluid from said duct into the fluid inlet of said passages.

7. An airfoil having spaced inner and outer walls at the leading edge thereof, the inner wall having spaced inwardly directed flanges providing a slot communicating with the space between said walls, a duct having spaced inwardly directed flanges providing a slot extending longitudinally of the duct, the duct flanges and the inner wall flanges having interlocking formations, and a securing member bridging said slots and provided with formations for retaining said flanges in interlocking relation, said securing member being apertured to provide for passage of fluid through said slots and between the interior of the duct and the space between said inner and outer walls.

8. An airfoil having spaced inner and outer walls at the leading edge thereof, the inner wall having spaced inwardly directed flanges providing a slot communicating with the space between said walls, a duct having spaced inwardly directed flanges providing a slot extending longitudinally of the duct, the duct flanges and the inner wall flanges being provided with interlocking formations whereby the duct flanges nest in interlocking relation within the inner wall flanges, and means bridging said slot for holding said interlocking formations engaged, said bridging means providing spaced openings along the slot for passing fluid.

ELWYN H. PETERS.
LLOYD F. ENGELHARDT.
JAMES L. BRIERTON.

REFERENCES CITED

The following references are of record in the file of this patent:

UNITED STATES PATENTS

| Number | Name | Date |
|---|---|---|
| 1,540,105 | Cook | June 2, 1925 |
| 1,821,776 | Vining | Sept. 1, 1931 |
| 2,256,393 | Klein | Sept. 16, 1941 |